United States Patent [19]

DiDominicis

[11] 4,240,841
[45] Dec. 23, 1980

[54] NO-CARRIER CORRUGATING ADHESIVE

[75] Inventor: Alphonse J. DiDominicis, Woodridge, Ill.

[73] Assignee: CPC International Inc., Englewood Cliffs, N.J.

[21] Appl. No.: 926,048

[22] Filed: Jul. 19, 1978

[51] Int. Cl.$^3$ .............................................. C08L 3/00
[52] U.S. Cl. ................................... 106/211; 106/213
[58] Field of Search .................. 106/213, 211; 127/32

[56] References Cited

U.S. PATENT DOCUMENTS

| | | | |
|---|---|---|---|
| 2,102,937 | 12/1937 | Bauer | 106/213 |
| 2,216,179 | 10/1940 | Bauer | 127/32 |
| 2,427,562 | 9/1947 | Kesler et al. | 106/211 |
| 3,155,527 | 11/1964 | Mentzer | 106/213 |
| 3,355,307 | 11/1967 | Schoenberger et al. | 106/213 |
| 3,429,828 | 2/1969 | Laden et al. | 106/213 |
| 3,485,669 | 12/1969 | Kunze | 127/32 |
| 3,728,141 | 4/1973 | Ray-Chaudhuri | 106/213 |
| 3,912,530 | 10/1975 | Musselman | 106/213 |

OTHER PUBLICATIONS

Ralph W. Kerr, Chemistry and Industry of Starch, Academic Press, Inc., N.Y., N.Y., 1950, pp. 618, 619.

*Primary Examiner*—Theodore Morris
*Attorney, Agent, or Firm*—Stanley M. Parmerter

[57] ABSTRACT

No-carrier corrugating adhesives having improved rheological characteristics for high speed machine use in the production of corrugated materials are described. These adhesives, which comprise alkaline, aqueous dispersions of partially swollen starch material, contain up to about 4% by starch weight of a flow modifier for providing the adhesive with a Bostwick viscosity of less than about 75 seconds to 15 centimeters.

2 Claims, No Drawings

NO-CARRIER CORRUGATING ADHESIVE

BACKGROUND OF THE INVENTION

This invention relates to starch-based corrugating adhesives. One usual method of making corrugated board consists of corrugating a strip of paper by means of a corrugated roller, applying an adhesive to the tips of the flutes on one side of that paper and adhering another strip of paper called a "liner", to the flute tips by use of heat and under high pressure.

The resultant product, called a "single face" corrugated board, may be used as is. However, it is usual to make "double face" (also called "double back") board by sending the single face board into a second stage of the corrugating machine called the "double backer" stage. Adhesive is there applied to the opposite flute tips, and a second liner of paper is adhered to that opposite side by the use of heat and under a relatively small amount of pressure. The use of a great amount of pressure in the adherence of the second strip of paper would tend to crush the corrugations. This makes the adhesive problem in the second step quite difficult.

Starch-based corrugating adhesive formulations have been in wide use since the advent of the Stein-Hall technology as disclosed in U.S. Pat. No. 2,051,025, granted Aug. 18, 1936, to J. V. Bauer, and U.S. Pat. No. 2,102,937, granted Dec. 21, 1937, also to J. V. Bauer.

A Stein-Hall type adhesive is a two component aqueous system. One component in this system is generally formed from a cooked, or gelatinized starch material which serves as a carrier phase. The second component or phase is formed from a raw, ungelatinized starch material. The second phase is a latent or potential adhesive phase which is only fully developed after the adhesive has been applied to the tips of the flutes of the corrugated web, the liner has been pressed against the adhesive-coated flutes, and heat and pressure have been applied to cause it to gelatinize and develop structure.

The raw starch material in the adhesive swells and gelatinizes as the newly assembled corrugated board is passed through a hot plate-dryer system that is associated with a corrugating machine. The system also partially dries the corrugated board and sets the adhesive sufficiently so that it can be subjected to subsequent operations, such as trimming, slitting, and sheeting without delamination.

The initial degree of cohesiveness in the bond of the corrugated board is referred to as the green bond strength. This characteristic determines the ability of the newly formed corrugated board to resist the instantaneous high shear forces that are developed during subsequent processing operations, such as the trimming, slitting, and sheeting operations, and is not necessarily an indication of the final bond strength.

After corrugated board has been trimmed, slit, and sheeted, it is stacked and sent to storage. There the adhesive cures to full strength. Until the bond is dry and fully cured, the corrugated board may be delaminated by slowly and firmly pulling the liner away from the corrugated sheet.

Since the middle thirties, one of the major advances in corrugating adhesive technology is that disclosed in U.S. Pat. No. 3,355,307, granted Nov. 28, 1967, to John J. Schoenberger and Raymond P. Citko. That patent discloses a single phase corrugating adhesive referred to as a "no-carrier" system. In this system, partially swollen starch granules are present as a homogeneous phase, suspended in an aqueous, alkaline vehicle. The elimination of the carrier phase permitted substantial operating economies. The no-carrier type corrugating adhesive disclosed and claimed in the Schoenberger-Citko patent is applied and cured in the same manner as the Stein-Hall type adhesive formulations.

A drawback of some no-carrier adhesives, however, is that they may not exhibit a viscosity which will facilitate application of the adhesive to the tips of the flutes during corrugation. The difficulties inherent in obtaining a precise, partial degree of swelling make close control over this viscosity difficult. As a result, uniform application of the adhesive to the flute tips may become quite difficult.

The foregoing drawbacks are particularly evident during high speed corrugation such as that obtainable by the recent advance set forth in U.S. patent application Ser. No. 795,263 filed May 9, 1977 now abandoned of Gary H. Klein and Merle J. Mentzer. At higher speeds, the tolerance for adhesives having poor rheological characteristics is correspondingly reduced.

That patent application, the disclosure of which is incorporated herein by reference, includes disclosure of a no-carrier adhesive, an essential component of which is a starch material formed by saponification of starch ester having at least about 30% greater area under an Instron force-time heating curve and at least about 30% greater area under an Instron force-time cooling curve than unmodified starch under the same conditions. This reconstituted starch (or saponified starch ester) is most preferably formed from a starch ester having a saponifiable degree of substitution of at least 0.015.

Although it has not yet been determined precisely how this starch material functions, it has been shown to have the ability to permit machine speeds that are ordinarily at least about 50% or 100% higher than have previously been obtained utilizing conventional starch materials such as unmodified starch.

This property of permitting higher operating speeds (in excess of 180, more preferably in excess of 230, meters per minute) is obviously of substantial importance. It permits substantial increases in productivity, and does so with virtually no additional capital expense.

Unfortunately, the foregoing drawback of poor rheological characteristics common in the no-carrier adhesives can greatly limit these increases in operational machine speeds. As a consequence, the improvement of the present invention is particularly useful with this special class of improved, starch ester-derived adhesives.

The instant invention will be better understood by the following detailed discussion of several specific embodiments. In this discussion, all parts and percentages are by weight, on a commercial basis, unless expressly stated to be otherwise. The commercial basis for the starch materials includes about 12% moisture by weight.

DESCRIPTION OF THE INVENTION AND PREFERRED EMBODIMENTS

In accordance with the present invention, a no-carrier adhesive corrugating composition is formulated. The essential constituents of such adhesives include alkali, water, and a starch material in partially swollen state. This composition is then modified by incorporation of a flow modifier. When combined, these constituents form an alkaline, aqueous dispersion of partially swollen starch material of improved rheological characteristics for high speed operation.

The starch material for the present adhesives may be selected from among those known in the art. Thus it may comprise unmodified starch or any of the known modified starch forms—including potato and corn starch—or modified starches—including oxidized starch and dextrins—or starch derivatives, such as starch esters, phosphates, cationic starches or the like. In general, the starch material should comprise between about 10 to 25%, preferably between about 18 to 22%, by total weight of the adhesive.

In a preferred embodiment of this invention, the starch material is formed by saponification of starch ester having at least about 30% greater area under Instron forcetime heating curve and at least about 30% greater area under Instron force-time cooling curve than unmodified corn starch under the same test conditions. This preferred class of reconstituted starch material is commonly formed from starch esters—preferably starch acetate, starch succinate, or starch acetate-succinate—having a saponifiable degree of substitution of at least about 0.015. They provide a substantial increase in the speed at which the corrugating machinery can be operated.

The alkali employed in the present invention is most commonly sodium hydroxide. Other common strong alkali can, however, be used. This constituent is normally present in an amount of from about 2 to 6% by starch weight, depending upon the starch material utilized. For most prior art starch materials, an alkali concentration of from about 2 to 4%, preferably 2 to 3% is commonly utilized. For the starch ester starting-materials of the present invention, however, sufficient excess alkali must be present to effect saponification. For this class of starch materials, between about 3 and 6%, preferably between about 4 and 5%, alkali by starch weight is therefore preferred.

The amount of water present in the adhesives of the present inventions can vary greatly. It is generally dependent largely on the nature of the starch component and on the degree of partial swelling of the starch material. Commonly, however, the adhesive formulations will contain between about 65 and 80%, more preferably 70 and 85%, water by total weight.

In addition to the foregoing essential constituents of the present adhesive, other common additives may, of course, be present. Of these optional additives, borax is the most common. This chemical is generally utilized to increase the gel structure of the adhesive paste. In addition, it has a tendency to increase the gel temperature of the formulation. Generally, up to about 5% borax based on total starch weight may be incorporated in the formulations. A more usual quantity would be between about 2 to about 3%.

In the present no-carrier systems, boric acid may be utilized because it also serves as a swelling reaction stopper. The boric acid will be quickly converted to a borate and is then able to serve as a substitute for the added borax. As it is used herein, the term "borax" will therefore include those borates which are present by virtue of the addition of boric acid.

The present adhesives are typically prepared by mixing the starch material and water at a low temperature (ordinarily between about 10° and 50° C.) in a mixer and adding alkali at a controlled rate. The starch material begins to swell and increases slowly in viscosity. When the desired degree of swelling is achieved (usually as measured by Brookfield, Stein-Hall, or like viscosity) boric acid may be added to stop the reaction.

The flow modifiers of this invention are generally added to the adhesive after the degree of swelling has been stopped. Addition at this stage facilitates control over the rheological characteristics of the adhesive.

The flow modifiers of the present invention may be selected from among those conventional in the paper coating art. Such flow modifiers represent a recognized class of additive and are described in a number of publications, including *PULP AND PAPER Chemistry and Technology* by J. P. Casey, Interscience Publishers (1961) Vol. III, pp. 1646 to 1651 et seq.; *STARCH AND STARCH PRODUCTS in PAPER COATING*, TAPPI Monograph Series No. 17 (1957), pp. 109–112; *Coating Formulations—Principles and Practices* by A. H. Nadelman and G. H. Baldauf, Lockwood Trade Journal Co., Inc. (1966), pp. 71–74. Despite the fact that the formulations for starch coatings are quite distinct from those of corrugating adhesives (coatings normally employ substantially higher starch adhesive solids, pigment proportions of up to 80%; and a totally gelatinized starch phase), certain flow modifiers of that art may be utilized in the present environment to provide improved rheological characteristics facilitating application of the adhesive to the flute tips.

The present flow modifiers should be employed in an amount of up to about 4%, preferably between about 0.2 and 3%, by starch material weight. The precise amount of flow modifier may vary dependent upon the particular adhesive and flow modifier employed. Optimization of the use of flow modifier within this concentration range is, however, readily determinable.

With appropriate flow modifiers within the foregoing concentration ranges, it is possible to reduce and/or maintain the adhesive at a viscosity (measured by conventional Bostwick technique—a test using the Bostwick consistometer as described in *Fundamentals of Quality Control for the Food Industry*, A. Kramer, Avi Publishing Co., Westport, Conn., 1966, pp. 57-58) of less than about 75 seconds to 15 centimeters. Preferably, the Bostwick viscosity provided should reside within the range of from about 20 to 50 seconds to 15 centimeters. Adhesives having this Bostwick viscosity are particularly suited for corrugating use. Their rheological characteristics are such that they are readily and evenly applied to the flute tips during corrugation. This property of the adhesive permits operation at the full, optimum speed for a given adhesive and therefore, permits full realization of the potential of that adhesive for high speed operation and maximum efficiency.

Not all flow modifiers of the coating art are, however, useful in accordance with the present invention. Some flow modifiers of the paper coating art simply do not have the desired effect on rheological characteristics. In similar manner, those providing the desired effect and reduction of Bostwick viscosity show substantial variation in activity. Furthermore, other classes of compounds, for example, fatty acids such as lauric acid, are useful as flow modifiers in the present invention. Determination of which of the members of the class of chemical flow modifiers are useful herein must therefore be made on an empirical basis.

Despite the somewhat unpredictable nature of these flow modifiers, however, certain ones are attractive. Accordingly, suitable groups of flow modifiers include urea, thiourea, alkali metal halides (particularly chlorides), alkaline metal salts of fatty acids having from 6 to 20 carbons, fatty acids having from 6 to 20 carbons and mixtures thereof.

Other flow modifiers may, however, be utilized in accordance with the present invention. Operability is readily determined by simple testing. For example, by incorporating 4% by starch weight of a known paper coating flow modifier into any adhesive formulation having a Bostwick viscosity of about 300 seconds to 15 centimeters, suitable modifiers for this invention are readily identified. The adhesive's Bostwick viscosity should be reduced to below 75 seconds to 15 centimeters.

A still greater understanding of the present invention is provided by the examples which follow. In these examples, comparison is also provided with conventional paper-coating flow modifiers which do not function as flow modifiers in accordance with the present invention.

EXAMPLE 1

1100 grams of starch acetate having a saponifiable degree of substitution of more than 0.03 were slurried in 3560 ml of water at 45° C. To the starch slurry, 1000 ml of caustic soda solution (4.86% by weight) was added over a period of about 10 minutes. The resultant swelling reaction was terminated after the adhesive reached a viscosity of 700 cps. by the addition of 18.4 grams of boric acid.

The viscosity of the final adhesive was 2000 cps. at 20 rpm (Brookfield viscosity) and 20 seconds (Stein-Hall viscosity). The adhesive's rheological characteristics as measured by a Bostwick consistometer—time in seconds for 75 ml of adhesive to flow 15 cm (or as otherwise specified if it did not flow that far) were 300 seconds to 15 cm. This viscosity was unacceptable for high speed corrugating machine.

Aliquots of the adhesive were set aside and combined with 2% by weight of conventional paper-coating flow additives. After mixture, these aliquots showed the following comparative results:

| Adhesive | Bostwick viscosity (to 15 cm) |
| --- | --- |
| (Control, no modifier) | (300 sec.) |
| Urea | 30 sec. |
| Acetamide | 210 sec. |
| Thiourea | 90 sec. |
| Ammonium Thiocyanate | 340 sec. |
| Salicylic Acid | 112 sec. |
| Potassium Chloride | 78 sec. |
| Potassium Iodide | 115 sec. |
| Lauric Acid | 2 sec. |
| Calcium Stearate | 40 sec. |
| Dicyandiamine | 180 sec. |

EXAMPLE 2

A second control adhesive was prepared as set forth in Example 1. Aliquots of this adhesive were combined with Hodag P X-85 (a modified polyethylene glycol laurate), sodium stearate, and sodium bisulfite. At a 2% by solids weight, these additives provided the following alteration of the initial Bostwick viscosity of 360 seconds to 15 cm:

| Adhesive | Bostwick viscosity |
| --- | --- |
| Hodag, PX-85 | 360 sec. to 11 cm. |
| Sodium stearate | 330 sec. to 15 cm. |
| Sodium bisulfite | 300 sec. to 15 cm. |

EXAMPLE 3

A third control adhesive was prepared as set forth in Example 1. Aliquots of this adhesive were combined with CORARES H-101 (a modified urea formaldehyde resin), CORARES H-121 (a ketone aldehyde resin) and urea. The resins are described in Bulletin No. COS-28-01, CORARES—Resins for Waterproofing Corrugating Adhesives, Corn Industrial, a Division of CPC International, Inc., Englewood Cliffs, N.J. At 2% by solids weight, these additives gave the following results:

| Adhesive | Bostwick viscosity (to 15 cm) |
| --- | --- |
| (Control, no modifier) | 330 |
| CORARES H-121 | 240 |
| CORARES H-101 | 120 |
| Urea | 35 |

The foregoing data shows the substantial variation in properties of flow modifiers from the paper coating art when transposed into the adhesive compositions of this invention. Of the foregoing, urea, lauric acid, and calcium stearate are particularly active in accordance with the present invention. And of these, lauric acid may be useful at as low as about 0.2% by weight, or about one-tenth the optimum concentration of urea and calcium stearate.

Further, while other of the exemplary flow modifiers (particularly thiourea, potassium chloride and potassium iodide) are useful herein, they generally require concentrations at the maximum of the present range in order to achieve the rheological characteristics which will permit high speed operation of corrugating machinery.

It will be readily appreciated that flow modifiers other than those specifically set forth in the foregoing examples are operable within the scope of the present invention. Identification of these individual modifiers and appropriate concentrations are (as previously indicated) readily determinable.

What is claimed is:

1. In a high-speed, no-carrier corrugating adhesive comprising an alkaline, aqueous dispersion of partially swollen starch material formed by saponification of a starch ester having a degree of substitution of at least about 0.015 and having at least about 30% greater area under an Instron force-time heating curve and at least about 30% greater area under an Instron force-time cooling curve than unmodified starch under the same conditions, wherein the starch material comprises between about 10% to 25% by total weight of adhesive, the improvement comprising an effective amount of flow modifier up to about 4% by starch material weight, wherein said flow modifier comprises lauric acid, for improving the rheological characteristics of said dispersion to provide said adhesive with a Bostwick viscosity of less than about 75 seconds to 15 centimeters.

2. The adhesive of claim 1, wherein the flow modifier comprises calcium stearate.

* * * * *